United States Patent [19]

Lecourtier et al.

[11] 4,420,715

[45] Dec. 13, 1983

[54] APPARATUS FOR CONTROLLING MOTOR SPEED

[75] Inventors: Georges Lecourtier; Jean-Claude Bouquigny, both of Paris, France

[73] Assignee: CII Honeywell Bull, Paris, France

[21] Appl. No.: 280,084

[22] Filed: Jul. 2, 1981

[30] Foreign Application Priority Data

Jul. 11, 1980 [FR] France ............................. 80 15547

[51] Int. Cl.³ ............................................. H02P 5/16
[52] U.S. Cl. ................................... 318/301; 318/311; 318/318
[58] Field of Search ............... 318/301, 310, 311, 314, 318/318, 319

[56] References Cited

U.S. PATENT DOCUMENTS

| | | | |
|---|---|---|---|
| 4,242,619 | 12/1980 | Nakamura et al. | 318/318 |
| 4,278,924 | 7/1981 | Mawatari et al. | 318/318 |
| 4,311,949 | 6/1982 | Pelkmann et al. | 318/318 |
| 4,348,585 | 9/1982 | Hoffman | 318/318 |

Primary Examiner—J. V. Truhe
Assistant Examiner—A. Evans
Attorney, Agent, or Firm—Lowe, King, Price & Becker

[57] ABSTRACT

The rotational velocity of a magnetic disc having a magnetic index and driven by a DC motor is controlled. Transducer means responsive to the index derives an electric signal once during each turn of the disc. A clock source derives a plurality of fixed frequency clock waves during each turn of the disc. A counter responsive to the clock source and the electric signal derives a digital signal each time the disc completes a revolution. The digital signal indicates a deviation between the number of clock waves derived by the source during the revolution and a predetermined number, preset into the counter during each turn. A velocity control signal supplied to the motor is controlled by the digital signal.

12 Claims, 6 Drawing Figures

APPARATUS FOR CONTROLLING MOTOR SPEED

TECHNICAL FIELD

The present invention relates generally to apparatus for controlling the rotational velocity of an electric motor and more particularly to a motor speed controller including a counter that is stepped at a predetermined fixed frequency a plurality of times between adjacent resettings of the counter that occur in response to the shaft having traversed a predetermined angular distance.

BACKGROUND ART

The present invention is described in connection with controlling the rotational speed of a driving motor for a magnetic disc memory. However, it is to be understood that the invention is, in certain respects, applicable to driving any electric motor having a high velocity output shaft wherein the velocity must be controlled with very great precision, for example greater than $10^{-4}$.

Magnetic disc memories are extensively utilized in data processing systems because such memories have extremely high storage capacity and require relatively short access time to read signals from and write signals into the storage medium by way of read and/or write heads for transducing information between the disc and readout circuitry. Magnetic discs carry data on circular, concentric recording tracks having radial widths typically no greater than a few hundredths of a millimeter. The recording tracks cover a relatively high proportion of both surfaces of the disc. In presently available discs, in particular discs for memories having a relatively small number of discs, such as fewer than four or five discs, data are contained on each disc surface and distributed along equal and adjacent circular sectors. One disc surface is normally divided into several decades of sectors, such as forty to fifty sectors. A detailed description of such a data distribution topography is found, for example, in copending U.S. application (LKP&B docket 037-069), Ser. No. 186,294, filed Sept. 11, 1980, entitled Method of and Apparatus for Displacing a Movable System With Respect to a Data Carrier, and commonly assigned with the present invention. The magnetic discs of a disc memory are coaxially mounted in parallel planes and usually of identical diameter. The several discs forming a disc memory are driven by an output shaft of a single DC electric motor.

It is presently the trend in the development of magnetic discs to increase the longitudinal, i.e., linear, density of information packed in a unit length along the circumference of a track on the disc. The mean number of binary information items contained in a magnetic disc track may, at present, reach one hundred thousand. Because of this high packing density, it is necessary to ensure that the data are written into or read from the disc with a minimum error risk.

To this end, it is necessary to determine the time the beginning of each sector passes beneath a magnetic read/write head with great precision. The beginning of a sector is the part of a sector which is chronologically the first portion of the sector to pass beneath a read/write head for transducing magnetic data on a disc surface into electric signals. The beginning of a sector is assumed to coincide with a diameter of the disc surface. If m is the number of sectors on a disc surface, any sector of rank k amongst the m sectors is chronologically positioned from a given reference time by providing, at the periphery of the disc, beyond the recording tracks containing the binary data, a special, reference magnetic datum, commonly referred to as an "index". The housing of the magnetic disc memory carries a magnetic readout transducer which is located so that during each turn of the disc, the magnetic datum index passes beneath the transducer at a particular time $t_0$. The magnetic read transducer derives an analog electric signal pulse in response to the index pasing beneath it. A shaping circuit converts this electric pulse into a relatively short duration, precisely timed pulse that is part of a binary or logic signal. It is to be recalled that an analog signal is a signal having a voltage or current amplitude that continuously varies between a pair of limits, one of which is usually positive and the other of which is usually negative. A logic or binary signal is a signal which can assume no more than two values, referred to as binary or logic zero or binary or logic one levels.

In the prior art, the location of any sector of rank k of the disc is determined by measuring the time which elapses between time $t_0$, when the index mark is beneath the transducer, and the time $t_k$ when a read head associated with the disc derives a pulse corresponding to the beginning of the sector of rank k. Because the rotation speed of the disc is assumed to be perfectly constant, the interval separating times $t_0$ and $t_k$ is accurately known and predetermined. To locate the start of an optional disc sector with high precision, it is necessary for the interval $t_k-t_0$ to always be equal in time to the quantity $\Delta t$, where $\Delta t$ is an incremental time that is the same for each sector of rank k from time $t_0$. This is true regardless of the time at which it is sought to locate the beginning of the sector of rank k. It follows that the rotational speed of the motor driving the disc must remain exactly constant as a function of time, i.e., the disc drive motor speed must be controlled with very great precision. In situations in which the linear data packing density on the disc is on the order of one hundred thousand information items per track, it is mandatory for the number of erroneous data read from or written into the track not to exceed one unit, i.e., a read or write precision of $10^{-5}$ is necessary. In these circumstances, it is necessary for the rotational speed of the disc drive motor to be controlled with a precision at least equal to $10^{-5}$.

To control the motor speed to this precision, the true rotational speed $v_m$ of the motor is measured and compared against a reference speed $v_R$, to derive a speed error signal $\Delta v = (v_m - v_R)$. The voltage or current supplied to an armature or field winding of the DC drive motor for the disc memory, and therefore the motor speed, is controlled as a function of the error signal $\Delta v$.

The prior art device for carrying out the motor speed control includes an initializing means formed by an index transducer responsive to the index on the periphery of the disc. The index transducer derives a pulse in response to the disc index passing beneath it. The pulse derived by the transducer is supplied to a circuit for shaping the pulse into a relatively narrow, precisely defined pulse having a leading or trailing edge with a predetermined time position relative to the index passing the index transducer. During each turn of the disc, the initializing means thus derives a relatively narrow logic pulse having a leading or trailing edge which defines the initial time $t_0$ for a reference position of the disc during each turn thereof. If i denotes the i-th revolution of the disc and (i+1) denotes the (i+1)th revolution of the disc, the corresponding pulses are derived at times specified by $t_{0i}$ and $t_{(i+1)}$.

The prior art device also includes timing means for deriving a periodic, rectangular pulse signal having a period P and frequency F, such that the frequency and period of the signal are highly accurate. A speed measuring means responds to the signals derived by the initializing means and the timing means, to determine the disc speed $v_m$. Disc speed $v_m$ is determined by measuring the number of rectangular pulses derived by the timing means during the interval between times $t_{0i}$ and $t_{0(i+1)}$. The number of rectangular pulses derived during the interval from $t_0$ to $t_{0(i+1)}$ is expressed in analog form as a variable amplitude signal current or voltage, or in digital form as a number of logic pulses.

A comparing means responds to the determined speed $v_m$ and a reference speed $v_R$ to derive an analog error signal having a magnitude proportional to $\Delta v$. A voltage or current source for the motor is responsive to the analog voltage or current proportional to $\Delta v$, to supply the armature or field winding of the motor with a voltage or current having a magnitude proportional to $\Delta v$. The prior art device employs speed measuring and comparison means that are formed by different elements containing a significant number of analog circuits. The extensive use of analog circuits, particularly for the comparator, impairs the precision with which the velocity of the motor speed can be controlled and frequently makes it impossible to achieve control of the disc speed to a precision of at least $10^{-5}$.

It is, accordingly, an object of the present invention to provide a new and improved apparatus for controlling the rotational velocity of a motor.

Another object of the invention is to provide a new and improved apparatus for precisely controlling the rotational velocity of a motor driving a magnetic storage disc.

A further object of the invention is to provide a new and improved apparatus for controlling the rotational speed of a motor shaft with a precision of at least $10^{-5}$.

An additional object of the invention is to provide a new and improved apparatus for controlling the speed of a magnetic disc containing on the order of ten thousand information items per track, such that the number of erroneous data read from a track of the disc does not exceed one unit.

A further object of the invention is to provide a new and improved apparatus for precisely controlling the rotational speed of a motor by employing a digital circuit for deriving an error signal for the motor speed.

DISCLOSURE OF INVENTION

In accordance with the present invention, an improved apparatus for controlling the rotational velocity of a motor includes a counter that is reset in response to a shaft driven by the motor passing a reference rotational position during each turn of the shaft. In the preferred embodiment relating to controlling a magnetic disc rotational velocity, the reference rotational position is at the index on the periphery of the disc. The counter is stepped at a predetermined fixed frequency a plurality of times between adjacent resettings of the counter, so that the counter has a count at the time of its resetting indicative of the diviation between the actual shaft speed and a preset shaft speed. In the preferred embodiment, the preset shaft speed is supplied to the counter each time the counter is reset. A velocity control signal is derived from the counter each time the counter is reset. The velocity control signal has a magnitude directly proportional to the deviation between the actual shaft speed and the preset shaft speed. Thereby, the velocity control signal has a zero amplitude in response to a zero deviation. A voltage or current source supplies a variable amplitude analog signal to the motor, to control the motor velocity, in response to the velocity control signal. In one specific embodiment, the analog source for controlling the motor velocity includes means for supplying an analog signal to the motor, which analog signal has a magnitude directly proportional to the deviation. The source can be considered as including a digital to analog converter responsive to the counter.

Thus, the present invention makes it possible to avert the shortcomings of the prior art by considerably reducing the number of analog circuit elements. The counter performs the dual functions of measuring the speed of the disc or shaft and of comparing the measured speed with the reference speed, preset after every turn of the disc. Thereby, the counter derives a digital signal that is an accurate representation of a comparison of the measured and reference speeds. The accuracy of a counter to derive a signal indicative of the deviation between the measured and reference speeds is to be compared with the accuracy of an analog comparison means, in the form of a difference network. As is well known, analog difference networks are very susceptible to extremely large percentage errors for two signals having approximately the same magnitude, for very low deviations between the measured and preset velocities. A counter, by contrast, faithfully derives a number of pulses i.e., a number representing a signal, and is not susceptible to such percentage errors for very low deviations.

The invention can also be thought of as including initializing means for defining an initializing time $t_{0i}$, during turn i. A clock means derives a periodic signal having a frequency F. The true rotational speed $v_m$ of the motor is controlled by the initializing means and the clock means, to determine the shaft speed $v_m$ from the number of periodic signal pulses that occur between the initializing times of two successive turns $t_{0i}$ and $t_{0(i+1)}$. A motor supply means supplies the motor with a voltage or current which is a function of the difference between the measured, true rotational speed $v_m$ and a reference speed $v_R$. The speed measuring means comprises a counter that is initially set at each time $t_{0i}$ to a count which is a function of the reference speed $v_R$. The contents of the counting means at the end of each motor turn are thus a function of the difference between the measured speed and the reference speed. The motor means supplies the motor with a voltage or current which is a function of the count of the counter immediately prior to the counter being reset or initialized.

The above and still other subjects, features and advantages of the present invention will become apparent upon consideration of the following detailed description of several specific embodiments thereof, especially when taken in conjunction with the accompanying drawing.

BEST MODE FOR CARRYING OUT THE INVENTION

Figure 1:
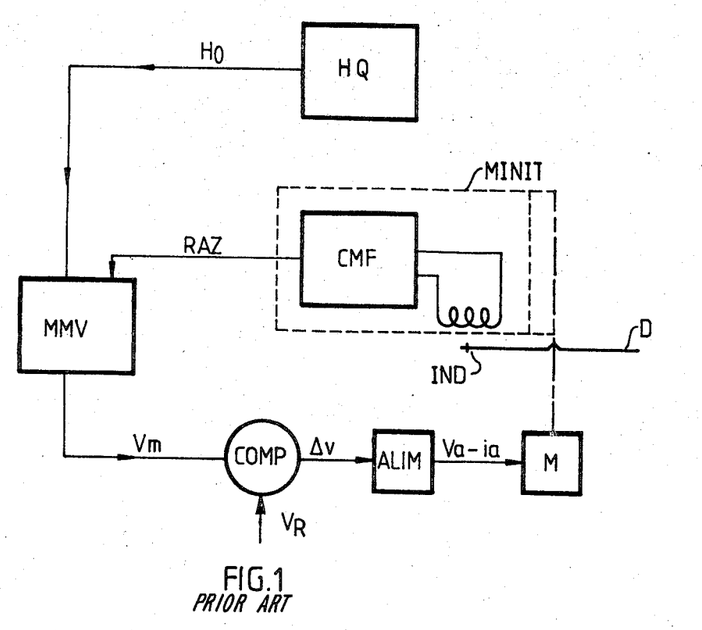
FIG. 1 is a block diagram of a prior art device for controlling the rotational speed of an electric motor driving a magnetic disc.

To gain a clear grasp of the structural and functional principles of the motor speed controlling device in accordance with the invention, a prior art device for controlling the rotational speed of an electric motor is discussed in connection with FIG. 1, wherein the controlled motor M drives a magnetic disc D, forming part of a computer disc memory, not shown. Disc D includes an index IND located at the disc periphery, beyond the recording tracks of the disc.

The prior art device for controlling the rotational speed of the output shaft of motor M and therefore of disc D includes an initializing network MINIT which responds to index IND to derive a reset signal RAZ once each time disc D is rotated by motor M. Signal RAZ is supplied to a speed measuring circuit MMV, also responsive to clock pulses $H_0$ periodically derived from clock source HQ at a frequency such that several pulses $H_0$ are derived between adjacent occurrences of signal RAZ. Speed measuring circuit MMV counts the number of clock pulses $H_0$ between adjacent occurrences of pulses in signal RAZ to derive a signal $v_m$ proportional to the rotational speed of motor M and disc D. Signal $v_m$ is an analog signal that is applied to comparator COMP, also responsive to an analog reference signal $v_R$, having a magnitude proportional to the desired speed of motor M. Comparator COMP is typically an analog subtraction network which derives an analog difference signal v proportional to the difference $v_m - v_R$. Typically, signals $v_m$, $v_R$ and v are DC signals and motor M is a DC motor. Signal v is supplied to a DC voltage or current supply source ALIM which feeds a voltage $V_a$ or current $i_a$ having a magnitude controlled by v to DC motor M. Motor M responds to the magnitude of voltage $V_a$ or current $i_a$ so that the motor speed and the speed of disc D are proportional to $V_a$ or $i_a$.

Typically, a rectangular pulse having a very short duration defines an initializing time $t_{0i}$ for the i-th revolution or turn of disc D in response to index IND passing beneath a stationary magnetic transducer head included in initializing network MINIT. The signal transduced by the head in initializing circuit MINIT is supplied to shaping circuit TMF which derives a pulse in signal RAZ once for each turn of disc D. Signal RAZ thus includes a short duration pulse which occurs at a time precisely related to the time when index IND passes beneath the transducer head in initializing circuit MINIT. Thus, the time interval between corresponding portions, such as the leading edge, of adjacent pulses in signal RAZ is inversely related to the speed of motor M and disc D.

Speed measuring circuit MMV responds to clock pulses $H_0$ and adjacent pulses in signal RAZ to count the number of clock pulses separating a pair of adjacent initializing times $t_{0i}$ and $t_{0i(i+1)}$ of two consecutive turns i and (i+1) of disc D. Speed measuring circuit MMV responds to the number of clock pulses $H_0$ between two consecutive turns i and (i+1) to derive an analog signal $v_m$.

If the resistance torque of motor M is significant, as is typically the case in DC electric motors that drive magnetic discs of a disc memory, the armature or field coil of the motor is supplied with a current always having the same polarity. In response to motor M reaching a rotational speed approximately equal to the reference speed $v_R$, control of the speed of motor M occurs as follows: the speed of motor M increases in response to the driving torque applied to the motor being greater than the resistance torque of the motor, i.e., in response to $v_m$ being greater than $v_R$. In such a situation, the magnitude of the current flowing in the armature or field coil of motor M is reduced. Conversely, if the driving torque of motor M is less than the motor resistance, the motor speed decreases, and the intensity of current flowing in the motor armature or field coil increases.

As indicated supra, the use of analog circuits for deriving the error signal $\Delta v$ has certain deleterious results. In particular, if there is a very slight error, whereby $v_m$ is approximately $v_R$, there is a high probability of a significant error in the magnitude and even polarity of error signal $\Delta v$. The present invention, as schematically illustrated in FIG. 2, derives the error signal as a digital signal, containing a number of pulses proportional to the error of the motor speed for a predetermined angular displacement of the motor, such as one turn.

Figure 2:
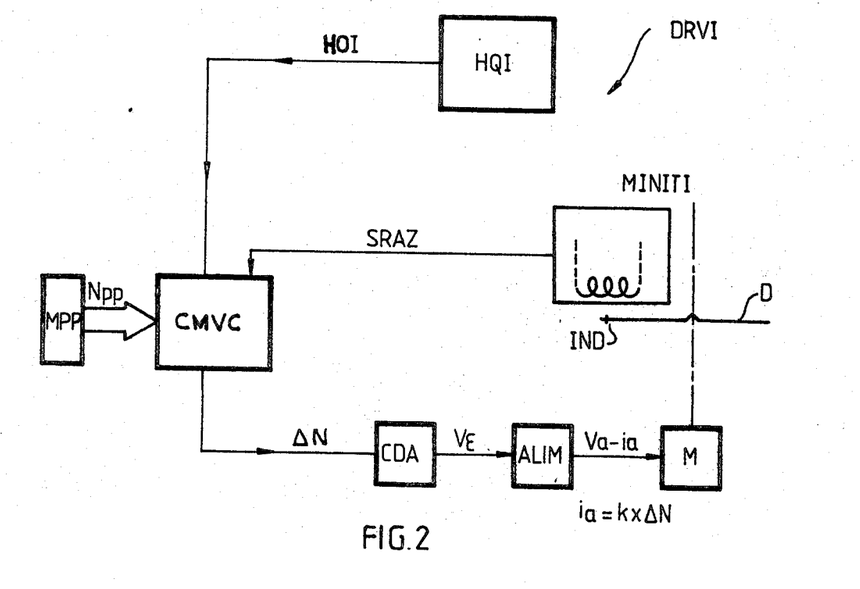
FIG. 2 is a block diagram of a device in accordance with the present invention for controlling the rotational speed of an electric motor.

To these ends, the apparatus of FIG. 2 includes an initializing circuit MINITI which derives a signal SRAZ, including a short duration pulse which occurs once for each turn of disc D, as driven by motor M. Pulses in signal SRAZ are supplied to a counter CMVC, also responsive to clock pulses HOI, as derived from clock source HQI. The frequency of clock pulses HOI is considerably greater then the frequency of pulses in signal SRAZ so that a relatively large number of pulses HOI occur between adjacent pulses in signal SRAZ. Counter CMVC is initially preset to a count $N_{pp}$, proportional to the desired velocity $v_R$ for disc D; count $N_{pp}$ is derived from multi-bit digital source MPP and is supplied to counter CMVC each time a pulse in signal SRAZ is derived. Counter CMVC derives a digital signal $\Delta N$ each time disc D makes one turn in response to each pulse in signal SRAZ. The magnitude of $\Delta N$, as derived from counter CMVC, is equal to the initial count $N_{pp}$ preset into the counter by source MPP once for each turn of disc D minus the number of clock pulses HOI that occur between adjacent pulses in signal SRAZ.

The digital signal $\Delta N$ derived from counter CMVC during each turn of disc D is supplied to digital to analog converter CDA. Digital to analog converter CDA responds to the value of $\Delta N$, as derived by counter CMVC for each turn of disc D, to derive an analog error signal $V_\epsilon$. Analog error signal $V_\epsilon$ has a magnitude proportional to the magnitude of $\Delta N$, and therefore indicative of the error in the actual speed of disc D and the desired speed of the disc. Signal $v_\epsilon$ is thus constant during each turn of disc D, but is subject to change after a turn of the disc has been completed. Signal $v_\epsilon$ is supplied to voltage or current source ALIM which supplies a speed control DC voltage $V_a$ or DC current $i_a$ to the field winding or armature of motor M that drives disc D.

In operation, for each turn or revolution i of disc D, initializing circuit MINITI derives a short duration rectangular pulse SRAZ, the leading edge of which defines a reference time $t_{0i}$ for turn i. In response to the leading edge of rectangular pulse SRAZ, source MPP sets counter CMVC to a negative count equal to $-N_{pp}$. In response to each subsequent clock pulse H01 of clock source HQI during turn i, counter CMVC is incremented by a count of one. The $N_{pp}$ count initially set into counter CMVC at reference time $t_0$ is proportional to the reference speed $v_R$. The multi-bit binary value supplied by source MPP to counter CMVC is equal to the desired number of clock pulses HOI that are to be derived from source HQI during turn i of disc D. Thus, the number $N_{pp}$ is equal to the number of pulses of clock signal HOI which should occur during time $t_R$ if disc D is rotating at the reference speed, where $t_R$ is equal to the time required for one turn of disc D when the disc is driven at the reference speed.

During the i-th turn of disc D, between times $t_{0i}$ and $t_{0(i+1)}$, counter CMVC responds to a number $N_m$ of clock pulses HOI wherein $N_m$ corresponds to the measured speed $v_m$, such that $N_m = 1/(v_m P)$, and P is the period of clock pulses HOI. At time $t_{0(i+1)}$, counter CMVC has a count equal to $\Delta N = N_m - N_{pp}$. A serial digital signal having a value commensurate with $\Delta N$ is supplied by counter CMVC to digital to analog converted CDA which converts the magnitude of $\Delta N$ into an analog signal $v_\epsilon$ that is supplied to motor voltage or current source ALIMI. The current $i_a$ or voltage $V_a$ supplied by source ALIMI to the armature or field coil of motor M is proportional to $\Delta N$. Thus, the current $i_a$ supplied by source ALIM to motor M is equal to $k\Delta N$, where k is a coefficient relating the gains of converter CDA and source ALIM to the value of $\Delta N$ and has a dimension of current strength, i.e., k has dimensions of amps per counting unit of counter CMVC. It is apparent that the magnitude of the current $i_a$ supplied by source ALIM to motor M increases as $\Delta N$ increases, i.e., $i_0$ has a positive value in response to the measured speed of motor M being less than the reference value $v_R$. In response to the error count $\Delta N$ having a zero value, the current $i_a$ supplied by source ALIM to the armature of motor M is zero.

Figure 3:
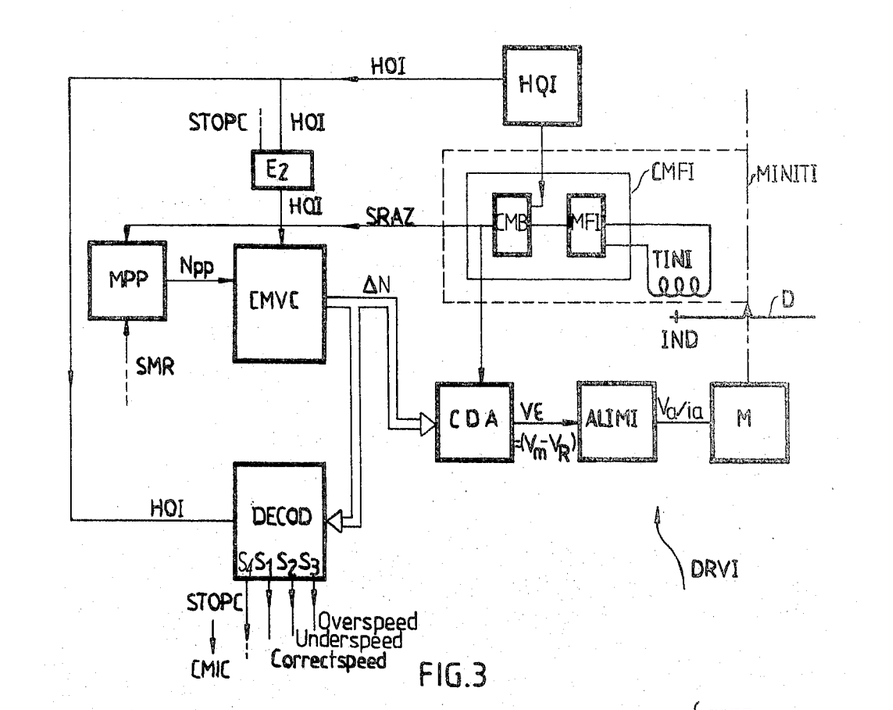
FIG. 3 is a block diagram, in more detail, of the device illustrated in FIG. 2.

As illustrated in greater detail in FIG. 3, initializing circuit MINITI includes a transducer TINI responsive to index IND on the periphery of disc D. Transducer TINI responds to the magnetic index IND to supply pulse shaper CMFI with an undulating, analog voltage that is converted by the pulse shaper into a rectangular pulse having a leading edge related to the occurrence times of pulses from clock source HQI and the time $t_0$ when index IND passes beneath transducer head TINI. To this end, transducer head TINI is connected to a pulse source MFI which derives a pulse having a duration slightly more than the duration between leading edges of adjacent clock pulses HOI, as derived from clock source HQI; the pulse derived from pulse circuit MFI is derived in response to index IND being transduced by head TINI. The pulse derived by pulse shaper MFI is applied to one terminal of flip-flop CMB, having a second terminal responsive to clock pulses having the same frequency as pulses HOI, derived from clock source HQI. Flip-flop CMB responds to clock pulses from source HQI and the pulses from pulse source MFI to derive pulses in signal SRAZ once during each turn of disc D. The pulses derived from flip-flop CMB are thus synchronized with clock pulses HOI and derived in response to the start of a track on disc D being detected in response to index IND passing head TINI. It is apparent from a comparison of FIGS. 1 and 3 that the initializing circuits of the prior art and the present invention are analogous, but differ slightly from each other because of the synchronism provided by the system of the present invention between the derivation of pulses in signal SRAZ to clock pulses HOI.

Pulses in signal SRAZ are supplied to source MPP of a parallel binary signal NPP, having a magnitude indicative of the desired speed $v_R$ of disc D and equal to the number of counts in clock signal HOI when disc D is travelling at the desired speed. In a preferred embodiment, source MPP is a buffer register that is supplied with a multi-bit, parallel or serial signal SMR that is indicative of a desired speed for disc D. Signal SMR is supplied to the buffer register when motor M starts. The contents of the buffer register are read out each time a pulse in signal SRAZ is derived from initializing circuit MINITI. Alternatively, source MPP can be a part of a read only memory that is read out in response to each pulse of signal SRAZ or part of an arithmetic logic circuit, as described infra.

The multi-bit binary signal having a magnitude NPP derived from source MPP in response to each pulse of signal SRAZ is supplied to counter CMVC as a serial signal or as a parallel signal, although the latter is preferred beacause it expedites loading of the counter with the magnitude of MPP. In one prefered embodiment, counter CMVC is a simple binary counter, such as a Texas Instruments 74LS 193.

During normal operation, counter CMVC derives a multi-bit, parallel output signal indicative of $\Delta N$ once during each turn of disc D. The value of the binary signal commensurate with $\Delta N$ is equal to $N_m 31 N_{pp}$ for the preceding turn of disc D. The multi-bit binary signal having a value $\Delta N$ derived from counter CMVC is applied in parallel to digital to analog converter CDA and decoder DECOD. Digital to analog converter CDA is responsive to each pulse in signal SRAZ, to sample the value of $\Delta N$ once for each turn of disc D. Thereby, converter CDA derives an analog signal $v_\epsilon$, having a magnitude and polarity equal to $v_m - v_R$ once for each turn of disc D.

Decoder DECOD responds to the clock pulse signal HOI and the parallel signal having a value $\Delta N$ to derive four signals on terminals $S_1$, $S_2$, $S_3$ and $S_4$ thereof. In response to the value of $\Delta N$ being in a range indicating that the speed of disc D is in an acceptable range, decoder DECOD derives a signal at output terminal $S_1$. In response to the speed of disc D being lower than an acceptable range, decoder DECOD derives a binary one signal on output terminal $S_2$ thereof. In response to the speed of disc D being higher than an acceptable range, decoder DECOD responds to the magnitude of $\Delta N$ to derive a binary one level on output terminal $S_3$.

During initial start-up of motor M and disc D, when the speed of disc D is considerably lower than the minimum acceptable speed, decoder DECOD derives a signal STOPC on output terminal $S_4$ thereof. The signal at output terminal $S_4$ of decoder DECOD is supplied to one input of AND gate $E_2$, having a second input responsive to the clock pulse signal HOI, as derived from clock source HQI. The binary one value on output terminal $S_4$ of decoder DECOD disables gate $E_2$, to prevent clock pulses HOI from being coupled to the increment input of counter CMVC. Thereby, counter CMVC is blocked and motor M is supplied with a maximum current $i_{max}$ in response to a maximum count being derived from counter CMVC. Gate $E_2$ remains disabled and the count of counter CMVC remains at a maximum output $\Delta N_{max}$ until the speed of disc D reaches a minimum value causing a binary one signal to be derived from terminal $S_2$ of decoder DECOD. In response to a binary one signal being derived at terminal $S_2$ of decoder DECOD, the signal at terminal $S_4$ of the decoder reverts to a binary zero value, thereby enabling AND gate $E_2$ to supply clock signals from source HQI to the increment terminal of counter CMVC.

Figure 4:
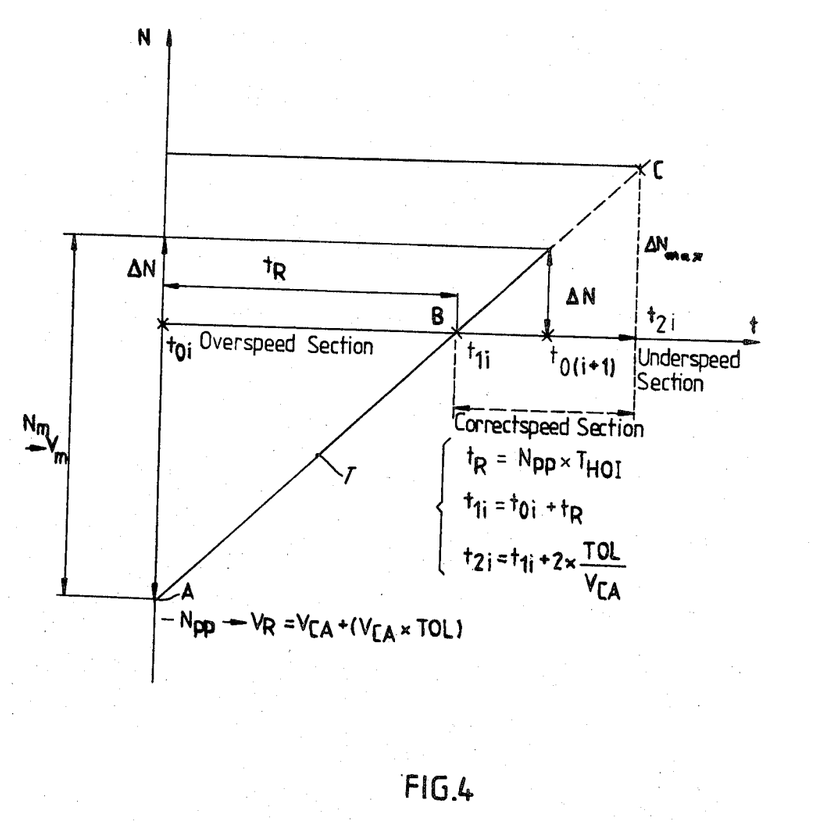
FIG. 4 is a graph of the status of a counter in the device of FIGS. 2 and 3, as a function of time.

To provide a more detailed analysis of the operation of the circuit of FIG. 3, consideration is given to FIG. 4, a diagram of different speed ranges and the value of N, as a function of time, t. At time $t_0$, when index IND causes a pulse in signal SRAZ to be derived, counter CMVC is preset at a count of $-N_{pp}$ which is related to the desired or reference speed for disc D. In particular, if $v_{CA}$ is a desired rotational speed for disc D that is proportional to the rated rotational speed of motor M, and TOL is the precision, i.e., tolerance, required for the rotational speed of disc D, $v_r$ is equal to $v_{CA}+v_{CA}(-TOL)$. Typically, the tolerance TOL has a value on the order of $10^{-4}$ or $10^{-5}$. The value of $v_R$ is equivalent to the maximum rotational speed of motor M and disc D, in the acceptable speed range. If the measured speed of motor M and disc D is greater than $v_R$, the motor is considered as having an excessively high rotational velocity, whereby the motor speed is decreased. The rotation period for one revolution of disc D at the reference speed $v_R$ is equal to $t_R = 1/v_R$. The value of $t_R$ can be expressed as being equal to the value of $N_{pp}(P)$, where P is defined supra, whereby $t_R$ is speed expressed in number of revolutions of disc D per second.

After disc D has rotated one turn, whereby the interval $t_{0(i+1)}-t_{0i}$ has elapsed, the count in counter CMVC is equal to $\Delta N$. The count of counter CMVC as a function of time is represented in FIG. 4 as a straight line $\tau$. Thereby, at the beginning of the turn, when $t=t_{0i}$, the straight line $\tau$ has a value at point A, at which time the counter is loaded with a value $-N_{pp}$ which is equivalent to $v_R = v_{CA}+v_{CA}\cdot TOL$. The straight line variation of curve $\tau$ assumes that motor M has constant speed, i.e., zero acceleration, during the interval from $t_{01}$ to $t_{0(i+1)}$. In the situation illustrated in FIG. 4, it is assumed that at the end of one turn, when $t=t_{0(i+1)}$, counter CMVC has a count $\Delta N$ at point F above the horizontal line D associated with $v_R$.

The value of $\Delta N$ at time $t_{0(i+1)}$ is in an acceptable range for the speed of disc D. The acceptable speed rnge is associated with a minimum time of $t_{1i}$ and a maximum time of $t_{2i}$, at points B and C along curve $\tau$. Point B on curve $\tau$ lies along line D and therefore is associated with the reference speed $v_R$; point B is commensurate with a value of $\Delta N=0$. If disc D is rotating at the slowest acceptable speed, counter CMVC derives an output count $\Delta N_{max}$ in response to a comparison of the number of pulses in clock signal HOI being greater than $N_{pp}$ by a predetermined maximum value, as indicated at point C on curve $\tau$. The minimum acceptable speed associated with the count $\Delta N_{max}$ and time $t_{2i}$ is equal to $t_{1i}+2(TOL)/v_{CA}$, where $t_{1i}$ is the time associated with $\Delta N=0$ and $v_{CA}$ is the desired rotational speed of disc D. In response to counter CMVC deriving a signal having a magnitude equal to $\Delta N_{max}$, converter CDA activates supply ALIMI with an error voltage having a maximum value, causing a maximum current $i_{max}$ or maximum voltage $v_{max}$ to be supplied to motor M. The value of $i_{max}$ or $v_{max}$ is equal to $k(\Delta N_{max})$. The rotation speed of motor M and disc D, during normal operation, is anywhere between a minimum value of $v_{ma}$, associated with $\Delta N_{max}$ and $v_R$, associated with $\Delta N=0$. During proper operation, point F is between points B and C along curve $\tau$, in which case motor M is supplied with a current $i_a$, having a value between $i_{max}$ and zero.

The value of $\Delta N$ is always positive or zero, whereby the current i supplied to motor M is always in the range from zero to $i_{max}$. In response to $t_{0(i+1)}$ being equal to $t_{1i}$, $\Delta N$ equals zero and the current supplied by source ALIMI to motor M is zero; the current supplied by source ALIMI has a maximum value $i_{max}$ in response to $t_{0(i+1)}$ being equal to $t_{2i}$. As the speed of motor M increases, causing a decrease in $\Delta N$, operating point F approaches point B, whereby the supply current i for motor M has a zero value when F=B. Because the maximum rotational speed for motor M is at point B, the speed of the motor cannot exceed $1/t_R$.

Figure 5A:
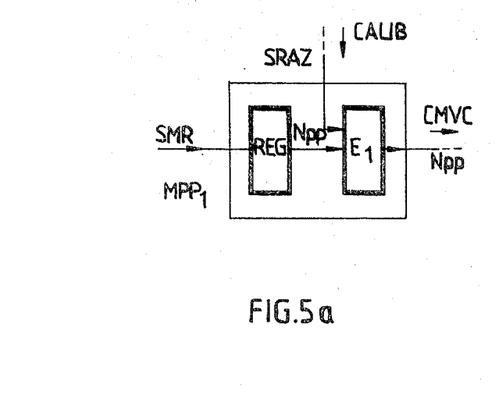
FIGS. 5a and 5b are first and second embodiments of means for initializing the counter in the device of FIGS. 2 and 3.
Figure 5B:
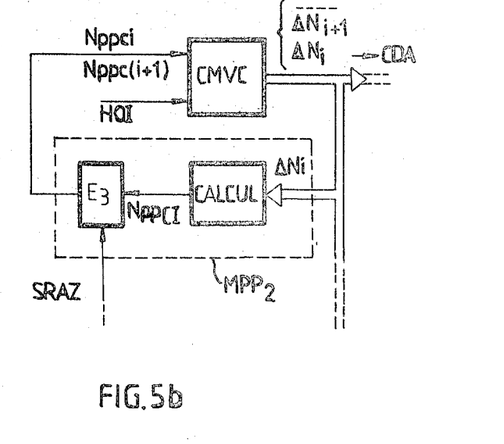

Reference is now made to FIGS. 5a and 5b wherein there are illustrated two preferred embodiments of the presetting source MPP in the device for controlling the speed in accordance with the invention.

In the embodiment of FIG. 5a, presetting source MPP is formed as network $MPP_1$ that includes a buffer register REG, having a multi-bit, parallel output in series with AND gate array $E_1$. Buffer register REG is a parallel register supplied with a parallel binary signal having a value equal to $N_{pp}$ when motor M is started. When motor M is started, signal SMR is derived by a central processing unit of a data processing system of which disc D is a part. Starting signal SMR is supplied to register REG, which responds to the signal to supply the parallel binary signal indicative of the number $N_{pp}$ to counter CMVC. To this end, one gate in array $E_1$ is provided for each stage of register REG. Thereby, the different binary levels representing the value of $N_{pp}$ are simultaneously supplied in parallel to and through AND gate array $E_1$. In response to index IND being sensed by head TINI and a pulse in signal SRAZ being derived, AND gate array $E_1$ is enabled to reset counter CMVC to a binary state associated with $-N_{pp}$.

In the second embodiment of source MPP illustrated in FIG. 5b, a digital arithmetic unit CALCUL is responsive to the digital output signal $\Delta N$ derived from counter CMVC each time that disc D turns. Arithmetic unit CALCUL derives a binary output signal $N_{ppci}$, having a value commensurate with a preset value for counter CMVC for turn i of disc D, wherein turn i starts at time $t_{0i}$. The output signal of arithmetic unit CALCUL is supplied once each turn of disc D through an array of AND gates $E_3$ as a preset input for counter CMVC. To this end, the gates in array $E_3$ are enabled in response to pulses in signal SRAZ once each turn of disc D.

Arithmetic unit CALCUL calculates a value of $N_{ppci}$ each time that disc D makes a turn by responding to preset values for $N_{CA}$, the number of clock pulses corresponding to the desired speed $v_{CA}$. The number of clock pulses $N_{CA}$ corresponding to speed $v_{CA}$ is determined from the relationship $N_{CA}=1/v_{CA}(P)$. Arithmetic logic unit CALCUL responds to the values of $N_{CA}$ and $\Delta N_i$, which is equal to $N_{mi}$ each time that counter CMVC is reset, to derive a binary signal $\Delta N_{ppci}=N_{mi}-N_{CA}$. Arithmetic unit CALCUL responds to the calculated value of $\Delta N_{ppci}$ and the value of $N_{ppci}$ calculated by it for the previous turn of disc D by adding the binary signals indicative of $\Delta N_{ppci}$ to $N_{ppci}$ to derive a binary signal having a value commensurate with the number $N_{ppc(i+1)}$.

Thereby, during each turn of disc D, arithmetic unit CALCUL derives an updated initial value for counter CMVC, whereby for turn (i+1) of disc D, arithmetic unit CALCUL derives a preset value for counter CMVC equal to $N_{ppc(i+1)}$ equal to $N_{ppci} + \Delta N_i$. The binary signal derived from arithmetic unit CALCUL is supplied either in series or in parallel through gate array $E_3$ to the set input terminals of counter CMVC. Thus, arithmetic unit CALCUL and gate array $E_3$ derive a sequence of binary signals having values $N_{ppci}$, $N_{ppc(i+1)}$, $N_{ppc(i+2)}$, etc. The differences between adjacent values of $N_{ppci}$, $N_{ppc(i+1)}$, $N_{ppc(i+2)}$ converge in such a manner that $\Delta N_{ppci}$, $\Delta N_{ppc(i+1)}$, etc. converge toward zero. Because gate array $E_3$ is enabled once each turn of disc D, a binary signal having a value $\Delta N_i$ is transmitted to digital to analog converter CDA at a reference position during each turn of disc D, when index IND is beneath head TINI.

While there have been described and illustrated several specific embodiments of the invention, it will be clear that variations in the details of the embodiments specifically illustrated and described may be made without departing from the true spirit and scope of the invention as defined in the appended claims.

We claim:

1. Apparatus for controlling the rotational velocity of a motor comprising a counter, means for resetting the counter in response to a shaft driven by the motor passing a reference rotational position during each turn of the shaft, means for stepping the counter at a predetermined fixed frequency a plurality of times between adjacent resettings of the counter, whereby the counter has a count at the time of the resetting indicative of the deviation between the actual shaft speed and a set shaft speed, the means for resetting including means for controlling the value to which the counter is reset each time the shaft passes the reference position, the value controlling means including means responsive to a deviation count derived from the counter each time the counter is reset and a signal commensurate with a count preset into the counter when the counter was last reset for adding the deviation count to the last preset count, means responsive to the counter for deriving a velocity control signal for the motor each time the counter is reset, the velocity control signal having a magnitude directly proportional to the deviation, whereby the velocity control signal has a zero amplitude in response to a zero deviation, and means for controlling the motor velocity in response to the velocity control signal.

2. The apparatus of claim 1 wherein the means for controlling includes means for supplying an analog signal to the motor, said analog signal having a magnitude directly proportional to the deviation.

3. The apparatus of claim 2 wherein the means for supplying includes a digital to analog converter responsive to the counter.

4. Apparatus for controlling the rotational velocity of a motor comprising a counter, means for resetting the counter in response to a shaft driven by the motor passing a reference rotational position during each turn of the shaft, means for stepping the counter at a predetermined fixed frequency a plurality of times between adjacent resettings of the counter, whereby the counter has a count at the time of the resetting indicative of the deviation between the actual shaft speed and a set shaft speed, the means for resetting including means for resetting the counter to a numerical value equal to the deviation derived as a result of revolution i plus a reset value supplied to the counter for revolution i, means responsive to the counter for deriving a velocity control signal for the motor each time the counter is reset, the velocity control signal having a magnitude directly proportional to the deviation, whereby the velocity control signal has a zero amplitude in response to a zero deviation, and means for controlling the motor velocity in response to the velocity control signal.

5. The apparatus of claim 1, 2, 3, or 4 further including means responsive to the deviation exceeding a predetermined magnitude for causing the counter to derive a predetermined count indicative of a maximum rotational velocity.

6. The apparatus of claim 1, 2, 3, or 4 further including means responsive to the deviation for indicating that the deviation is in a predetermined count range indicative of a desired velocity range, on one side of the predetermined count range indicative of a velocity less than a lower limit of the desired velocity range, and on a second side of the predetermined count range indicative of a velocity greater than an upper limit of the desired velocity range.

7. The apparatus of claim 1, 2, 3 or 4 further including means responsive to the deviation for indicating that the deviation is in a predetermined count range indicative of a desired velocity range, on one side of the predetermined count range indicative of a velocity less than a lower limit of the desired velocity range, and on a second side of the predetermined count range indicative of a velocity greater than an upper limit of the desired velocity range, and means for driving the motor at a maximum, predetermined velocity in response to the deviation being on the one side of the predetermined count range.

8. Apparatus for controlling the rotation speed $v_m$ of an electric motor comprising:
   initializing means for determining an initializing time $t_{0i}$ during each revolution of order number i;
   timing means for deriving periodic signals of frequency F;
   means measuring the true rotational speed $v_m$ of the motor in response to the initializing means and the timing means for determining the speed $v_m$ from the number of pulses of the periodic signal of frequency F separating two initializing time $t_{0i}$ and $t_{0(i+1)}$ corresponding to two consecutive revolutions;
   means for supplying the motor with a signal having a magnitude which is a function of the difference between the speed $v_m$ and a reference speed $v_R$, wherein the speed-measuring means comprises counting means controlled by presetting means which at the time $t_{0i}$ presents the counting means with a sequence of presetting values, one of which is derived for each revolution i, the sequence converging in such a manner that successive differences between successive presetting values associated with successive revolutions converge toward zero, the presetting values being a function of a reference speed $v_R$, the count of the counting means at the end of each revolution of the motor being a function of the difference between the measured speed $v_m$ and the reference speed $v_R$, the supply means being supplied with a signal having a magnitude that is a function of the counter count.

9. The apparatus of claim 7 wherein the presetting means comprises calculation means connected in series with an AND gate array, the array being connected in parallel to the counting means, the counting means having output terminals connected to an input terminal of the calculation means, output terminals of the AND gate array being connected to input terminals of the counting means.

10. The apparatus of claims 8, or 9 further including a decoding means responsive to the contents of the counter for indicating whether the measured speed $v_m$ is lower or higher than the reference speed.

11. The apparatus of claim 10 wherein the decoding means includes means for blocking the counting means during starting of the electric motor.

12. The apparatus of claim 8 wherein the presetting means includes means for resetting the counter to a numerical value that is a function of the difference derived by the counting means as a result of revolution i plus a reset value supplied to the counting means for revolution i.

* * * * *